United States Patent [19]

Fox et al.

[11] Patent Number: 5,348,101

[45] Date of Patent: Sep. 20, 1994

[54] HYDRAULIC SYSTEM FOR A TOWED IMPLEMENT

[75] Inventors: Robert E. Fox; William L. Smith, Jr., both of Des Moines; Thomas E. Boe, Cedar Falls, all of Iowa

[73] Assignee: Deere & Company, Moline, Ill.

[21] Appl. No.: 1,973

[22] Filed: Jan. 8, 1993

[51] Int. Cl.$^5$ .............................................. A01B 63/10
[52] U.S. Cl. ....................................... 172/2; 172/328; 172/316; 172/413
[58] Field of Search ............... 172/2, 4, 7, 248, 317, 172/313, 315, 316, 319, 324, 395, 396, 453, 465, 470, 328; 280/416.2, 414.5

[56] References Cited

U.S. PATENT DOCUMENTS

| | | |
|---|---|---|
| 2,974,733 | 3/1961 | Fletcher . |
| 3,627,053 | 12/1971 | Hook et al. . |
| 3,762,480 | 10/1973 | Hofer ................................ 280/414.5 |
| 4,193,458 | 3/1980 | Meinert et al. ...................... 172/328 |
| 4,434,857 | 3/1984 | Basrai ................................ 172/328 |
| 4,817,730 | 4/1989 | Winter . |
| 4,979,092 | 12/1990 | Bergene et al. . |
| 5,152,347 | 10/1992 | Miller . |

Primary Examiner—Randolph A. Reese
Assistant Examiner—Spencer Warnick

[57] ABSTRACT

A hydraulic rockshaft control circuit which includes a three-way valve that normally operates the rockshaft is connected to the lift cylinder on a trailing implement. A hitch lock valve connected to the rockshaft control valve maintains the rockshaft in a preselected position regardless of changes in pressure at the valve output. The extend side of the lift cylinder is connected to the control valve output so that the tractor hitch control is used to operate the trailing implement cylinder. To overcome the inability of the three-way valve to positively retract the trailing implement cylinder, a reducing/relieving valve is connected to the retract side of the cylinder and is adjusted to provide just enough pressure to retract the cylinder and raise the implement wheels from ground contact when the extend side is connected to return pressure.

A position feedback system on the implement is connected to the hitch control unit (HCU) on the tractor. When the HCU senses a feedback signal from the implement, the HCU control mode changes from rockshaft control to trailing implement control wherein implement position is set and maintained in a manner similar to that for the conventional rockshaft control. A voltage readout from the feedback signal provides a visual indication of implement position.

17 Claims, 1 Drawing Sheet

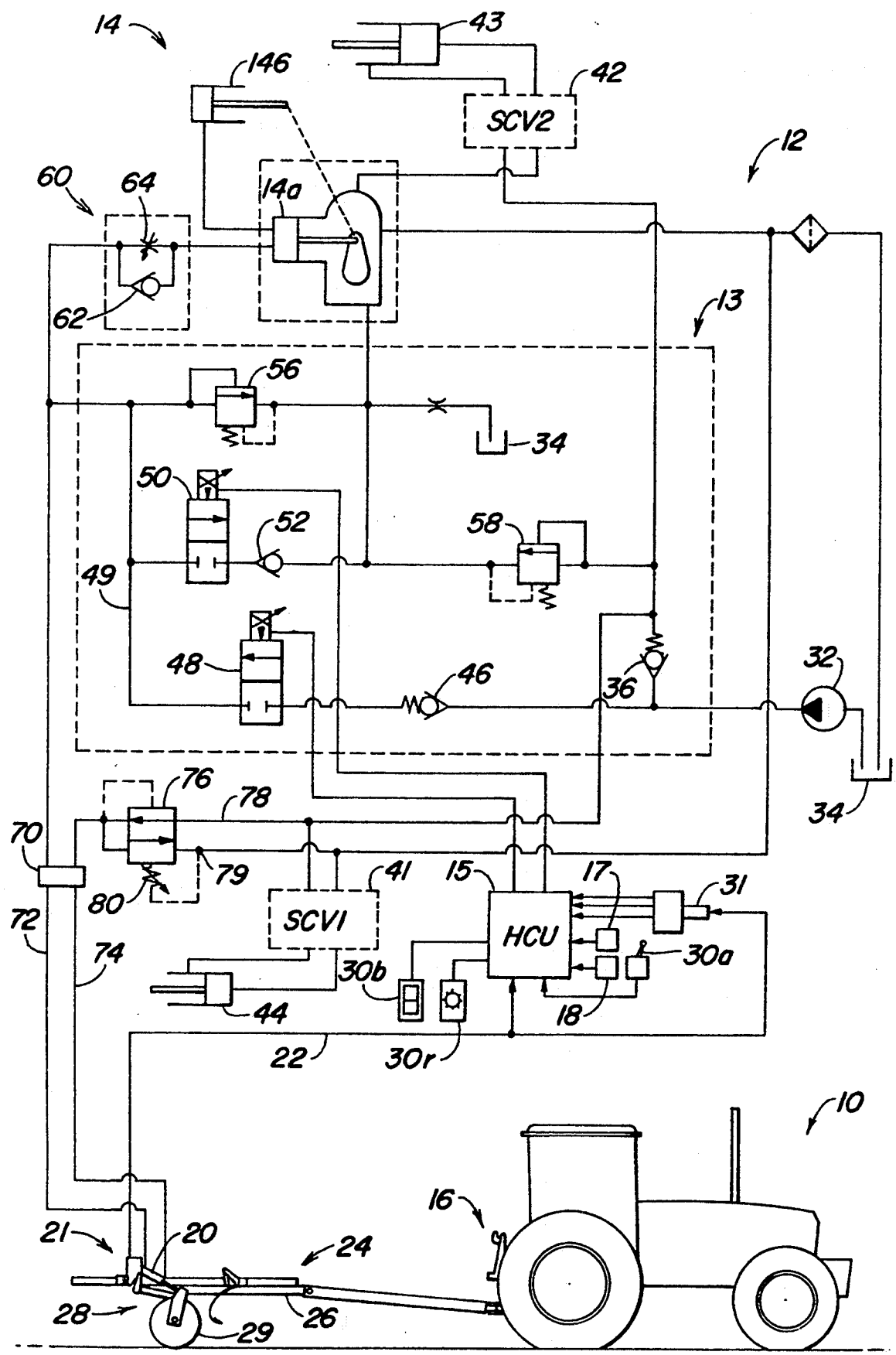

HYDRAULIC SYSTEM FOR A TOWED IMPLEMENT

BACKGROUND OF THE INVENTION

1) Field of the Invention

The present invention relates generally to an improved system for hydraulic control of a towed implement utilizing the tractor hitch control.

2) Related Art

Numerous systems have been proposed for utilizing the tractor hitch control for controlling a towed implement. For example, U.S. Pat. No. 3,627,053 shows a system wherein the hitch control valve and a selector valve control a remote cylinder of a towed implement. A system for automatically raising the tractor hitch to a non-interfering position and controlling a trailing implement cylinder when SCV control is shifted from the rockshaft cylinder to the trailing implement is shown in U.S. Pat. No. 5,152,347 of common ownership with the present invention. An electronic control unit (ECU) such as shown and described in U.S. Pat. No. 4,979,092 is utilized to control the trailing implement in response to input signals including a lever control signal, a position sensor signal and a draft force sensor signal. When the control input from the implement is plugged into the ECU, control is shut off to the 3-point hitch and automatically transferred to the trailing implement. Both a manually operated selector valve and at least one tractor selective control valve (SCV) are required in the system shown in U.S. Pat. No. 5,152,347.

When the ECU system is utilized with a typical lift and depth control arrangement such as for a disk harrow, the hydraulic cylinder on the implement operates as a one-way single acting cylinder with the hitch control valve functioning as a three-way valve wherein implement weight causes the cylinder to retract so the frame moves downwardly to the field-operating position. One problem with one-way operation is that the operator is unable to raise the wheels from ground contact when it is desirable to do so, for example, when the additional weight of the wheels could be used to assist tool penetration in certain ground conditions.

BRIEF SUMMARY OF THE INVENTION

It is therefore an object of the present invention to provide an improved hydraulic system for a towed implement. It is a further object to provide such an implement which overcomes the aforementioned problems.

It is another object to provide an implement control system which advantageously utilizes the existing tractor rockshaft controls to move and set attached implement position in much the same way that the rockshaft controls move and establish tractor hitch position. It is a further object to provide such a system which automatically switches from a hitch control mode to an implement position control mode when the implement is attached to the tractor without need for a manual select valve or use of one of the tractor SCV's.

It is yet another object to provide an improved hydraulic system with a cylinder which normally is operated as a one-way cylinder. It is a further object to provide such a system which facilitates two-way double acting cylinder operation without extensive or costly modification of the one-way system and with little or no noticeable deterioration of cylinder capacity or operation.

It is still another object of the invention to provide an improved hydraulic system which utilizes an existing three-way valve assembly to simulate four-way valve operation so that the valve assembly which otherwise would operate a cylinder in a single acting mode only can also accord two-way cylinder operation.

It is another object of the invention to provide an improved hydraulic system which enables two-way cylinder operation on a trailing implement utilizing the control valve that normally operates the rockshaft on a tractor. It is yet another object to provide such a control wherein the tractor SCV is free for use for other functions and wherein manual control valves to select control modes are eliminated.

It is still another object of the invention to provide two-way cylinder operation for an implement lift cylinder that normally is operated in a one-way mode so that the implement ground wheels can be raised from ground contact to increase effective frame weight for increased implement down force.

A hydraulic rockshaft control circuit which includes a 3-way valve that normally operates the rockshaft is connected to the lift cylinder on a trailing implement. A hitch lock valve connected to the rockshaft control valve establishes and maintains the rockshaft in a preselected position regardless of changes in pressure at the valve output. The extend side of the lift cylinder is connected to the control valve output so that existing tractor hitch controls are used to operate the trailing implement cylinder independently of additional operator controls. To overcome the inability of the three-way valve to positively retract the trailing implement cylinder, a reducing/relieving valve is connected to the retract side of the cylinder and is adjusted to provide just enough pressure to retract the cylinder (for example, in an implement lift system, enough pressure to raise the implement lift wheel assembly from ground contact when the extend side is connected to return pressure).

A position feedback system on the implement is connected to the hitch control unit (HCU) on the tractor. When the HCU senses a feedback signal from the implement, the HCU control mode changes from rockshaft control to trailing implement control and responds to the implement feedback signal in place of the signals from the hitch position sensor or draft force sensor. The implement position is set and maintained in a manner similar to that for the conventional rockshaft control without need for additional manual controls. Use of a tractor SCV no longer is required. A raise/lower rocker switch connected to the HCU and located in the tractor cab provides implement cylinder rephasing when held in the raise position. When the switch is released, the implement is maintained in its current position. Momentarily pushing the rocker switch to the lower position causes the implement to return to a preselected position which is determined by the position of the hitch lever. A raise limit control, which sets upper hitch position in the hitch control mode, sets upper transport position in the trailing implement control mode.

A voltage readout from the feedback signal provides a visual indication of implement position so the operator can control and monitor implement position and easily repeat a previously monitored position from inside the tractor cab. The valving added to the normal rockshaft control allows limited two-way cylinder operation; therefore, when the system controls an implement lift system, the wheels of the implement can be raised off the ground. The tractor hitch remains locked in its non-interfering position regardless of changes in pressure of the rockshaft control valve output.

These and other objects, features and advantages of the present invention will become apparent to one skilled in the art upon reading the following detailed description in view of the drawings.

BRIEF DESCRIPTION OF THE DRAWINGS

The single drawing figure is a schematic representation of a hydraulic control system for a tractor hitch and trailing implement constructed in accordance with the present invention.

DETAILED DESCRIPTION OF THE DRAWINGS

Referring now to FIG. 1, therein is shown a tractor 10 including a hydraulic control system 12 with a hydraulic hitch valve assembly 13 operably connected to a rockshaft assembly 14 with single acting rockshaft and lift assist cylinder 14a and 14b. An electronic or hitch control unit (HCU) 15 is connected to the valve assembly 13 for controlling a three-point hitch 16 connected to the rockshaft assembly 14. During operation in the hitch control mode, the HCU receives hitch position and/or draft load feedback signals from transducers 17 and 18, respectively, which are processed in a conventional manner to automatically position the hitch 16.

The HCU 15 alternately controls an implement control cylinder, shown as a depth control and lift cylinder 20. A feedback control system 21, responsive to movement of the trailing implement as a result of extension and retraction of the cylinder 20, includes a feedback line 22 which is plugged into the HCU 15. When the HCU 15 senses the presence of a feedback signal from the line 22, HCU operation is automatically switched from the normal hitch control mode to a drawn implement control mode. In the drawn implement mode, the HCU utilizes the position feedback signal rather than the hitch position or draft load feedback signals to provide control signals to the valve assembly 13.

As shown in FIG. 1, a drawn implement 24 is connected to the tractor 10 and includes a frame 26. The frame 26 is supported for movement vertically between a raised transport position (shown) and a range of lowered field-working positions by a conventional lift assembly 28 including wheels 29 and the cylinder 20. The feedback control system line 22 is connected to the HCU 15 to cause the HCU to operate in the drawn implement control mode and to provide feedback to the HCU for implement position control. Any type of conventional position transducer may be utilized to provide the feedback signal, but preferably a potentiometer connected for rotation with the implement rockshaft provides a voltage signal between about one to four volts on the line 22 when the implement 24 is connected to the tractor.

In the drawn implement control mode, the HCU 15 utilizes the feedback signal on the line 22 to position the trailing implement, generally in the same manner as the conventional ECU utilizes the hitch position feedback signal in the normal hitch control mode to vertically position the 3-point hitch 16. A hitch control lever 30a, which normally controls the rockshaft position in the hitch control mode, controls implement position in the implement control mode. The feedback line and a readout 31, preferably in the form of a voltmeter connected to the feedback line 22, provide good indications of implement position to both the operator and to the HCU so that implement position is accurately repeatable as the implement cycles between raised transport and lowered field-working positions. A raise/lower switch 30b which controls the rockshaft in the hitch control mode, controls the raising and lowering of the implement to and from the position selected by the lever 30a when the HCU is in the implement control mode. A raise limit control 30r sets uppermost hitch position in the hitch control mode and uppermost implement position in the drawn implement control mode. During operation in the hitch control mode, movement of the switch 30b momentarily to the raise position causes the hitch 14 to raise to the position determined by the control 30r. The controls 30a, 30b and 30r conveniently set the position of the implement 24 in the same manner as they set the hitch position, except that holding the rocker switch 30b in the raise position in the drawn implement control mode maintains continuous hydraulic fluid flow so that multiple cylinders 20 can be fully extended and rephased. Also, releasing the switch 30b from the raise position causes the implement to remain in the current position until the switch is rocked momentarily to the lower position to cause the implement to return to the position determined by the lever 30a.

The hydraulic system 12 includes a source of hydraulic fluid under pressure 32 with a reservoir 34. The source 32 is connected through a check valve 36 to selective control valves 41 and 42 (SCV1 and SCV2) which control the cylinders 43 and 44, respectively. The source 32 is also connected through a check valve 46 to a solenoid-operated pressure control valve 48 having an output 49 which communicates with the base or extend end of the cylinder 20 when the implement 24 is connected to the tractor. The output 49 is also connected to a second solenoid-operated control valve 50 which selectively provides a return to the reservoir 34 via check valve 52. A pressure responsive relief valve 56 is also connected between the output 49 and the reservoir 34. A second relief valve 58 in the assembly 13 is connected between the check valve 36 and the reservoir 34.

A hitch lock-up valve 60 with a check-valve 62 and a fully closable adjustable restriction 64 is installed between the output 49 of the hitch control assembly 13 and the rockshaft assembly 14 so that free flow is provided to the assembly to raise the hitch 16. With the restriction 64 completely closed, the return path for the hydraulic fluid is completely blocked so the hitch 16 remains in the raised position regardless of the changes in pressure at the output 49 which result from HCU operation of the valve assembly 13 while in the implement control mode. The check valve 62 provides any fluid flow necessary to overcome any hitch cylinder leakage or the like that might otherwise cause the hitch position to drift.

The output line 49 of the control assembly 13 is coupled at location 70 to the base or extend side of the implement cylinder 20 by a valveless line 72. A return line 74 connected to the opposite or retract end of the cylinder 20 is coupled at 70 to a reducing/relieving valve 76 having a first port 78 connected via the check valve 36 to the source 32 and a second port 79 connected to the reservoir 34. The valve 76 maintains a positive pressure on the retract side of the cylinder 20 when the extend side of the cylinder 20 is returned to reservoir by actuating the valve 50. The retract-side pressure, which is regulated by a control 80, is adjusted to provide just enough pressure to retract the cylinder 20 fully (i.e., to raise the implement wheels off the ground, in the embodiment shown, when the line 72 is returned to reservoir through the valve 50). When the cylinder 20 is extended, the pressure in the line 74 moves the valve from the position shown in FIG. 1 to the lower position so that return fluid flows from the line 74 through to the port 79 and to the reservoir. Since the pressure at the input to the valve 76 necessary to lift the wheels is relatively low, the reduction in differential pressure across the piston of the cylinder 20 as a result of the addition of the valve 76 is also relatively low and impacts only slightly on cylinder lift function.

In operation without an implement 24 attached to the tractor 10, the lock-up valve restriction 64 is open, and the HCU operates in conventional fashion, utilizing operator control inputs from the controls 30a, 30b and 30r and feedback signals from the position and/or draft load transducers 17 and 18, to control fluid flow to and from the hitch cylinders 14a and 14b by selective energization of the valves 48 and 50 of assembly 13. To change to remote or drawn implement cylinder operation, the operator first raises the hitch to the full up position and, after turning off the tractor, closes the restriction 64 so that fluid flow between the rockshaft assembly 14 and the valve assembly 13 is permitted in one direction only to maintain the hitch in the raised position regardless of changes in pressure at the output 49. The lines 72 and 74 are coupled at 70 to the output 49 and the valve 76.

The feedback line 22 is connected to the HCU, and the tractor is started. The HCU senses the presence of a feedback signal on the line 22 and switches to the drawn implement control mode. The hitch lever 30a is moved back and forth until the cylinder 20 responds. The hitch lever 30a now controls the implement working depth, and the readout 31 indicates the feedback voltage so that implement setpoint is easily monitored and repeated. The hitch switch 30b is pushed to the raise position causing the HCU to activate the valve 48 to extend the cylinder 20 until the implement 24 is raised to an uppermost position which is set by the raise limit knob 30r, at which time the valve 48 is closed. Holding the rocker switch 30b in the raise position causes full extension of the cylinder 20 (for example, to rephase multiple cylinders). The cylinder 20 includes a rephasing groove (not shown) that permits fluid communication between opposite sides of the cylinder piston at the end of the stroke. Releasing the switch 30b from the raise position when the cylinder 20 is fully extended (after rephasing) causes the HCU to turn off the valve 48. Fluid flow via the groove permits the cylinder to retract a short distance until the implement settles to the fully raised position. During field-working operations, the control 30r can be set so that implement raised limit position is low enough that the earthworking tools on the frame 26 remove tractor tracks formed on the field ends during turns.

Releasing the switch 30b from the raise position prior to full extension of the cylinder 20 causes the HCU to return the valve 48 to the closed position and maintain the present implement position. By momentarily moving the switch 30b to the lower position, the HCU activates the valve 50 until the implement lowers to the position set by the lever 30a. The valve 76 permits the wheels 29 to be raised completely out of ground contact to increase effective frame weight in hard ground conditions for better tool penetration.

To return to hitch control mode operation, the tractor is first turned off, and the feedback cable 22 and the lines 72, 74 are disconnected. The hitch lock-up valve 60 is fully opened to facilitate normal hitch operation.

Having described the preferred embodiment, it will become apparent that various modifications can be made without departing from the scope of the invention as defined in the accompanying claims.

We claim:

1. In a hydraulic system for a tractor having a source of hydraulic fluid under pressure with a reservoir, at least one selective control valve (SCV) for controlling a remote hydraulic function, a rockshaft with a rockshaft cylinder, a hydraulic control circuit including control valve structure connected between the source and the rockshaft a hitch control unit for one-way operation of the rockshaft cylinder, an implement position control for an implement connected to the tractor, the implement having a remote cylinder with first and second ends and a rod moveable in first and second directions, the position control comprising:

means connecting the control valve structure to the first end of the remote cylinder for providing a fluid path between the control valve structure and the remote cylinder for controlling the remote cylinder from the hitch control unit to move the cylinder rod in the first direction;

means connecting a pressure responsive valve between the source and the second end of the remote cylinder for moving the cylinder rod in the second direction and thereby providing two-way operation of the remote cylinder from the hydraulic control circuit independently of an SCV.

2. In a hydraulic system for a tractor having a source of hydraulic fluid under pressure with a reservoir, a rockshaft with a rockshaft cylinder, a hydraulic control circuit including control valve structure connected between the source and the rockshaft cylinder, and a hitch control unit for operation of the rockshaft cylinder as a single-acting cylinder, an implement position control for an implement connected to the tractor, the implement having an operable remote cylinder with first and second ends, the position control comprising:

a hydraulic line connecting the control valve structure to the first end of the remote cylinder for selectively operating the remote cylinder from the hitch control unit;

a pressure reducing valve connected between the reservoir and the second end of the remote cylinder for providing double-acting operation of the remote cylinder from the hydraulic control circuit.

3. The invention as set forth in claim 2 further comprising a rockshaft lock valve, and means connecting the lock valve to the control circuit for locking the rockshaft in a preselected position when the remote cylinder is connected to the source.

4. The invention as set forth in claim 3 wherein the lock valve is connected between the control valve structure and the rockshaft cylinder for preventing fluid flow out of the rockshaft cylinder regardless of the pressure at the control valve structure, and the means connecting the control valve structure to the first end comprises a conduit providing generally unrestricted fluid flow between the control valve structure and the remote cylinder.

5. In a hydraulic system for a tractor having a source of hydraulic fluid under pressure with a reservoir, a rockshaft with a rockshaft cylinder, a hydraulic control circuit including control valve structure connected between the source and the rockshaft and a hitch control unit for single-acting operation of the rockshaft cylinder, an implement position control for an implement connected to the tractor, the implement having a remote cylinder with first and second ends, the position control comprising:

means connecting the control valve structure to the first end of the remote cylinder for controlling the remote cylinder from the hitch control unit;

a pressure responsive valve connected between the source and the second end of the remote cylinder for providing double-acting of the remote cylinder from the hydraulic control circuit; and feedback structure connected to the implement for providing a feedback signal dependent on remote cylinder extension, and means for connecting the feedback structure to the hitch control unit, wherein the hitch control unit is responsive to the presence of the feedback signal for automatically changing from a normal hitch control mode to an implement position control mode.

6. The invention as set forth in claim 5 wherein the hitch control unit includes a hitch control switch which controls rockshaft position in the hitch control mode and implement position in the implement position control mode.

7. The invention as set forth in claim 6 including a position control lever for selecting a return to position setting for the rockshaft in the hitch control mode and a return to position setting for the implement in the implement position control mode.

8. The invention as set forth in claim 7 wherein the hitch control switch has raise and lower positions and the hitch control unit is responsive movement of the switch to the raise position to maintain a continuous supply of hydraulic fluid under pressure to the remote cylinder regardless of the position of the control lever.

9. The invention as set forth in claim 8 wherein the hitch control unit is responsive to momentary movement of the switch to the lower position to operate the remote cylinder and move the implement to a position dependent on the lever position.

10. In a hydraulic system for a tractor having a source of hydraulic fluid under pressure with a reservoir, a hydraulically controlled rockshaft connected to tractor hitch structure for moving the hitch structure vertically between raised and lowered positions, at least one selective control valve (SCV) for controlling a remote hydraulic function, hitch control valve structure connected to the source and having an output port connected to the rockshaft, a hitch control unit (HCU) connected to the control valve structure for operating the rockshaft, the HCU having a first operator control for setting rockshaft operating position and a second operator control for raising and lowering the rockshaft and moving the rockshaft to the operating position determined by the first operator control, an implement position control system for an implement connected to the tractor and having a remote cylinder with first and second hydraulic ports, the position control comprising:

means for connecting the control valve structure output port to the first port of the remote cylinder for controlling the remote cylinder from the HCU independently of an SCV;

a feedback mechanism for providing a feedback signal dependent on implement position; and means connecting the feedback mechanism to the HCU, wherein the HCU is responsive to the feedback signal and the first and second operator controls for controlling implement position when the feedback mechanism is connected to the HCU.

11. The invention as set forth in claim 10 wherein the first operator control comprises means for setting hitch operating position when the feedback mechanism is disconnected and the second operator control comprises a switch having a raise and a lower position, and wherein the HCU is responsive to momentary movement of the switch to the lower position to operate the control valve structure and move the implement to the position set by the first operator control when the feedback mechanism is connected to the HCU.

12. The invention as set forth in claim 10 including a third operator control connected to the HCU for setting a rockshaft limit position, wherein the third control also establishes an implement limit position when the remote cylinder is controlled by the HCU.

13. The invention as set forth in claim 10 wherein the means connecting the control valve structure output port to the remote cylinder includes a valveless and substantially unrestricted hydraulic line.

14. The invention as set forth in claim 10 wherein the control valve structure normally provides one-way operation of the tractor hitch structure, the invention further including means connecting the second port of the remote cylinder to the reservoir for two-way operation of the remote cylinder from the control valve structure.

15. The invention as set forth in claim 14 wherein the means connecting the second port to the reservoir comprises a pressure responsive valve for providing pressure at the second port when the control valve structure returns the first port to reservoir.

16. The invention as set forth in claim 14 including a lock-up valve connected between the rockshaft and the control valve structure output port, and wherein the first port of the remote cylinder is connected to the lock-up valve, the lock-up valve including a check valve for providing hydraulic fluid flow in one direction to the rockshaft for maintaining the rockshaft in a preselected position regardless of changes in operating pressure at the first port of the remote cylinder.

17. The invention as set forth in claim 10 wherein the feedback mechanism comprises a transducer for providing a voltage signal to the HCU, the invention further comprising a display responsive to the feedback voltage signal for providing a display output corresponding to implement depth.

* * * * *